US012712134B2

(12) United States Patent
Rubenstein et al.

(10) Patent No.: US 12,712,134 B2
(45) Date of Patent: Aug. 18, 2026

(54) SYSTEMS AND METHODS FOR AUTOMATICALLY ADAPTING AN ELECTRIC OUTPUT OF AN ELECTRIC POWER SYSTEM

(71) Applicant: Powered Armor Technologies, LLC, Norwich, CT (US)

(72) Inventors: Eric Paul Rubenstein, Ellington, CT (US); Patrick VanBeek, Alameda, CA (US); Alan Louis Merriman, Norwich, CT (US)

(73) Assignee: Powered Armor Technologies, LLC, Norwich, CT (US)

( * ) Notice: Subject to any disclaimer, the term of this patent is extended or adjusted under 35 U.S.C. 154(b) by 471 days.

(21) Appl. No.: 18/193,266

(22) Filed: Mar. 30, 2023

(65) Prior Publication Data

US 2023/0317378 A1 Oct. 5, 2023

Related U.S. Application Data

(60) Provisional application No. 63/372,726, filed on Mar. 31, 2022.

(51) Int. Cl.
*H01G 11/72* (2013.01)
*H01G 11/08* (2013.01)
(Continued)

(52) U.S. Cl.
CPC ............. *H01G 11/08* (2013.01); *H01G 11/10* (2013.01); *H01G 11/24* (2013.01); *H01G 11/32* (2013.01); *H01G 11/72* (2013.01); *H01G 11/80* (2013.01)

(58) Field of Classification Search
CPC ........ H01G 11/08; H01G 11/10; H01G 11/24; H01G 11/32; H01G 11/72; H01G 11/80;
(Continued)

(56) References Cited

U.S. PATENT DOCUMENTS 6,008,548 A * 12/1999 Fenner .................. H02J 3/1828 323/208
8,231,712 B2 7/2012 Wójtowicz et al.
(Continued)

FOREIGN PATENT DOCUMENTS

CN 106771645 A * 5/2017 ......... G01R 27/2694
CN 109582657 A * 4/2019
(Continued)

OTHER PUBLICATIONS

Mandapati et al., Simple Capacitors to Supercapacitors—An Overview, Oct. 4, 2008, retrieved from—https://www.electrochemsci.org/papers/vol3/3111196.pdf, 22 pages (Year: 2008).*
(Continued)

*Primary Examiner* — Yongjia Pan
(74) *Attorney, Agent, or Firm* — TROUTMAN PEPPER LOCKE LLP; John Morrissett; Aaron E. Johnston

(57) ABSTRACT

Disclosed embodiments may include an electric power system. The electric power system may include a plurality of capacitors each including a first and second panel. The first panel may include a positive current collector, and a positive electrode including a nano-structured carbon material. The second panel may include a negative current collector, and a negative electrode including the nano-structured carbon material. Each capacitor may include an electrode separator disposed between the first and second panels, and an O-ring configured to form a seal between the first and second panels. The electric power system may include sensor(s) configured to detect one or more properties of the capacitors, processor(s) configured to analyze data associated with the detected properties based on algorithm(s), and control switch(es) configured to modify contact between the capacitors based on the analyzed data thereby resulting in auto-
(Continued)

matic adaptation of an electric output of the electric power system.

20 Claims, 3 Drawing Sheets

(51) Int. Cl.
*H01G 11/10* (2013.01)
*H01G 11/24* (2013.01)
*H01G 11/32* (2013.01)
*H01G 11/80* (2013.01)

(58) Field of Classification Search
CPC .... H01G 11/36; G01R 31/64; G01R 31/2843; G01R 19/2513
See application file for complete search history.

(56) References Cited

U.S. PATENT DOCUMENTS 8,615,812 B2 12/2013 Wójtowicz et al.
10,818,370 B1 * 10/2020 Wang .................. G11C 29/021
11,409,348 B2 * 8/2022 Suljic .................. G06F 1/28
2008/0010549 A1 * 1/2008 Coolidge .............. G01R 31/64 714/44
2008/0157783 A1 * 7/2008 Savary .................. G01R 31/64 324/548
2009/0187284 A1 * 7/2009 Kreiss .................. G06Q 50/06 700/297
2013/0057297 A1 * 3/2013 Cheng .................. H02M 7/539 324/548
2013/0204554 A1 * 8/2013 Tuckey .............. G01R 31/2843 702/58
2016/0300148 A1 * 10/2016 Kelly .................. G06F 11/008
2018/0003751 A1 * 1/2018 Berkcan .............. G01R 31/371
2018/0210023 A1 * 7/2018 Rostron ................ G08C 17/02
2018/0348285 A1 * 12/2018 Drofenik .................. H01G 4/35
2019/0035732 A1 * 1/2019 Pelletier ................ G01R 31/64
2019/0235008 A1 * 8/2019 Yates .................. G06F 1/26
2020/0021104 A1 * 1/2020 Song .................. H02H 1/0007
2021/0389379 A1 * 12/2021 Shao .................. G01R 31/64
2022/0271712 A1 * 8/2022 Gao .................. H02H 5/041
2022/0399753 A1 * 12/2022 Tao .................. G01R 31/64
2023/0262489 A1 * 8/2023 Nair .................. H04L 41/16 370/252

FOREIGN PATENT DOCUMENTS

CN 109961171 A * 7/2019 ............. G06Q 10/04
CN 113702780 A * 11/2021 ............... G06N 3/08
CN 113884839 A * 1/2022 ......... G01R 31/1227
WO WO-2015117557 A1 * 8/2015 ............. H01G 4/258

OTHER PUBLICATIONS

Hérou et al., High-Density Lignin-Derived Carbon Nanofiber Supercapacitors with Enhanced Volumetric Energy Density, Sep. 8, 2021, retrieved from—https://pmc.ncbi.nlm.nih.gov/articles/PMC8425891/, 12 pages (Year: 2021).*
Bon et al., Flexible poly(vinyl alcohol)-ceramic composite separators for supercapacitor applications, Aug. 3, 2018, retrieved from—https://www.sciencedirect.com/science/article/pii/S1226086X18304271, 7 pages (Year: 2018).*
Machine Learning Classifier use past predictions as features, Oct. 23, 2020, retrieved from—https://stackoverflow.com/questions/64505251/machine-learning-classifier-use-past-predictions-as-features, 1 page (Year: 2020).*
Bhargava et al., Review of Health Prognostics and Condition Monitoring of Electronic Components, Apr. 18, 2020, retrieved from—https://ieeexplore.ieee.org/stamp/stamp.jsp?tp=&arnumber=9075164&tag=1, 21 pages (Year: 2020).*
Liu et al., High-efficiency utilization of carbon materials for supercapacitors, 2020, retrieved from—https://onlinelibrary.wiley.com/doi/full/10.1002/nano.202000011, 19 pages (Year: 2020).*
Chiam et al., Electrochemical Performance of Supercapacitor with Stacked Copper Foils Coated with Graphene Nanoplatelets, Feb. 15, 2018, retrieved from—https://www.nature.com/articles/s41598-018-21572-x, 7 pages (Year: 2018).*
Tao et al., Towards ultrahigh volumetric capacitance: graphene derived highly dense but porous carbons for supercapacitors, Oct. 17, 2013, 8 pages (Year: 2013).*
Saleem et al., Performance Enhancement of Carbon Nanomaterials for Supercapacitors, 2016, retrieved from—https://onlinelibrary.wiley.com/doi/10.1155/2016/1537269, 17 pages (Year: 2016).*

* cited by examiner

SYSTEMS AND METHODS FOR AUTOMATICALLY ADAPTING AN ELECTRIC OUTPUT OF AN ELECTRIC POWER SYSTEM

CROSS-REFERENCE TO RELATED APPLICATIONS

This application claims the benefit of U.S. Provisional Application Ser. No. 63/372,726, filed on Mar. 31, 2022, the contents of which are fully incorporated herein by reference.

FIELD

The present application relates to systems and methods for automatically adapting an electric output of an electric power system.

BACKGROUND

Traditional ultracapacitors (UCs), also called Supercapacitors or electrochemical capacitors, are used in a variety of power-based systems, such as military systems, vehicles, structural components, etc. These power-based systems rely on the electric properties of the UCs, such as voltage, electric current, impedance, capacitance, and the like, to maintain functional circuitry.

SUMMARY

Disclosed embodiments may include a capacitor. The capacitor may include a first panel including a positive current collector and a positive electrode. The positive electrode may include a nano-structured carbon material having a density of between approximately 0.4 to 1.2 g/cm$^3$. The capacitor may include a second panel including a negative current collector, and a negative electrode including the nano-structured carbon material. The capacitor may include an electrode separator disposed between the first and second panels, and an O-ring configured to form a seal between the first and second panels.

Disclosed embodiments may include an electric power system. The electric power system may include a plurality of capacitors each including a first panel including a positive current collector, and a positive electrode. The positive electrode may include a nano-structured carbon material having a density of between approximately 0.4 to 1.2 g/cm$^3$. Each of the plurality of capacitors may further include a second panel including a negative current collector, and a negative electrode which may include the nano-structured carbon material. Each of the plurality of capacitors may further include an electrode separator disposed between the first and second panels, and an O-ring configured to form a seal between the first and second panels. The electric power system may further include one or more sensors configured to detect one or more properties of the plurality of capacitors. The electric power system may further include one or more processors configured to analyze data associated with the detected one or more properties based on one or more algorithms. The electric power system may further include one or more control switches configured to modify contact between the plurality of capacitors based on the analyzed data thereby resulting in automatic adaptation of an electric output of the electric power system.

Disclosed embodiments may include another electric power system. The electric power system may include a plurality of capacitors, one or more sensors, one or more processors, and one or more control switches. The electric power system may include a memory in communication with the one or more processors and storing instructions that, when executed by the one or more processors, are configured to cause the electric power system to automatically adapt an electric output of the electric power system. The electric power system may iteratively, until termination, perform one or more steps. These step(s) may include detecting, by the one or more sensors, one or more properties of the plurality of capacitors. These step(s) may include determining, utilizing one or more machine learning models, whether the detected one or more properties exceed a threshold. Responsive to determining the detected one or more properties exceed the threshold, these step(s) may include modifying, by the one or more control switches, contact between the plurality of capacitors thereby resulting in automatic adaptation of an electric output of the electric power system. These step(s) may include updating the one or more machine learning models based on the modified contact.

These and other features and attributes of the present disclosure and their advantageous applications and/or uses will be apparent from the detailed description which follows.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
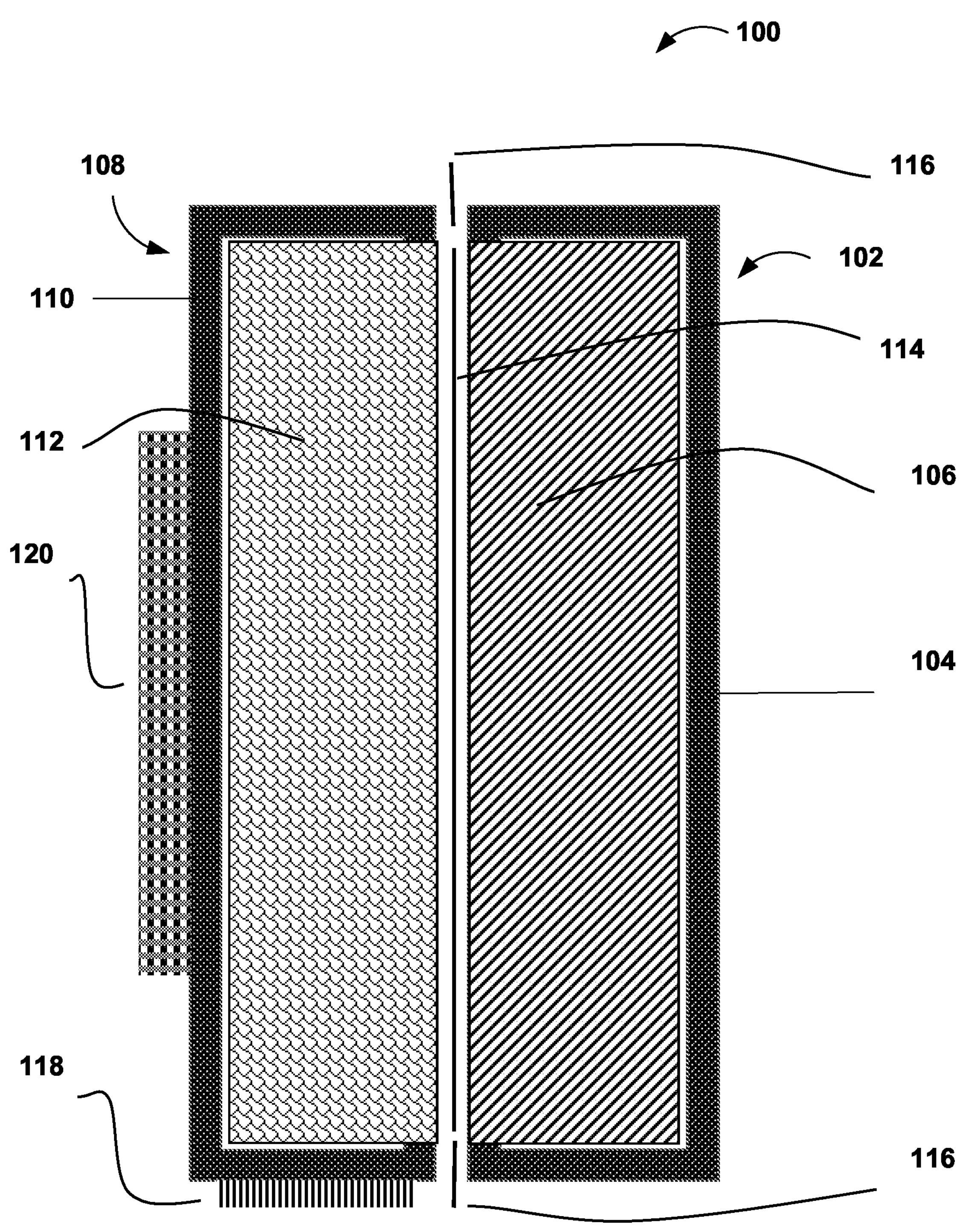
FIG. 1 provides an example capacitor, in accordance with certain embodiments of the disclosed technology.

Traditional UCs, also called Supercapacitors or electrochemical capacitors, are used in a variety of power-based systems, such as military systems, vehicles, structural components, etc. These power-based systems rely on the electric properties of the UCs to maintain functional circuitry. However, a substantial obstacle exists. In the event a structural UC breaks or is destroyed, it is likely that the specific UC will cease functioning altogether. Should that occur, the circuit to which the specific UC belongs may be partially deenergized. As a consequence, the voltage, electric current, impedance, capacitance, and other electric properties of the circuit are likely to be disrupted.

Accordingly, examples of the present disclosure may relate to systems and methods for automatically adapting an electric output of an electric power system. The systems and methods disclosed herein may provide for automatic and nearly immediate reconfiguration of an electric power system to protect the overall functioning of the system to which the UCs provide power.

For example, the UCs disclosed herein may be based on electrodes fabricated from the pyrolysis and activation of chemical precursors, such as phenol-formaldehyde, polyfurfuryl alcohol, or other polymer-based precursors. Further, the disclosed UCs may be produced using a nano-structured, highly microporous carbon material enabling fabrication of a UC that is multifunctional due to being structurally strong, very hard yet machinable, and possessing a vast network of Angstrom-scale pores throughout its volume, as discussed in U.S. Pat. Nos. 8,231,712 and 8,615,812, each of which are fully incorporated herein by reference in their entirety. For example, when studying the mechanical properties of a monolithic polyvinylidene chloride (PVDC) carbon sample, it was found that the surface hardness was great enough to resist scratching from any test item, including sharpened steel blades, other than a silicon-carbide rasp. Initial measurements were taken of the structural strength of two types of samples: 3 millimeters (mm) and 16 mm thick samples. In one series of tests, three-point shear tests were performed with the samples. Forces of up to approximately 50 kilograms (kg) were applied to the 16 mm discs, with no discernable flexure, chipping, or breakage. About 12 kg forces were applied, in a three-point shear test to the 3 mm discs—again there were no deleterious effects upon the samples. The thicker discs passed the following additional tests: 100 kg compression, 50 kg tensile, and 35 kg torsion/flexure.

Traditional UCs, on the other hand, lack the strength, fracture-resistance, or hardness to serve as a structural and/or protective element. However, since UC electrodes may be constructed with the material discussed in U.S. Pat. Nos. 8,231,712 and 8,615,812, it is possible to manufacture very strong, fracture-resistant, hard UCs that can be used to construct structural and/or protective elements, such as ballistic protection plates that store electricity for subsequent use. These individual cells may be simple in shape or complex, and may include conformal or non-planar morphologies. Various additive manufacturing technologies, frequently referred to as "3-D printing," enable fabrication of extremely complex, even interlocking components.

A key application of this highly microporous carbon material is its use as the electrode material for high energy-density UCs. Since the material has great mechanical strength and a density of between approximately 0.4 and 1.2 $g/cm^3$ (e.g., approximately 0.4 $g/cm^3$, 0.5 $g/cm^3$, 0.6 $g/cm^3$, 0.7 $g/cm^3$, 0.8 $g/cm^3$, 0.9 $g/cm^3$, 1.0 $g/cm^3$, 1.1 $g/cm^3$, or 1.2 $g/cm^3$), it has desirable properties for building applications. Due to its highly interconnected molecular structure, it is fracture-resistant, making it useful in many applications, such as body armor, vehicle armor, building protection, micro-meteorite/orbital debris (MMOD) shielding, and other protective applications. Among its desirable properties for ballistic protection is that high-speed impacts, such as from bullets, cause between approximately 3 and 6 cracks to form, thereby absorbing and distributing kinetic energy throughout the material. Since this material is between approximately 90.0 and 99.5% carbon by weight (e.g., approximately at least 90.0%, 90.5%, 91.0%, 91.5%, 92.0%, 92.5%, 93.0%, 93.5%, 94.0%, 94.5%, 95.0%, 95.5%, 96.0%, 96.5%, 97.0%, 97.5%, 98.0%, 98.5%, 99.0%, or 99.5%), it also acts as an effective shield against ionizing radiation. The use of this nano-structured, highly microporous carbon material to build structural UCs may greatly reduce cost, decrease energy consumption, provide life-saving protection against ballistic, mechanical, ionizing radiation, electromagnetic pulse (EMP), MMOD or other threats, and greatly proliferate highly efficient electric rechargeable systems into applications hitherto inaccessible to such enhancements.

Additionally, electric interconnections may allow multiple capacitors to be used to power systems. Each UC unit has a maximum operating voltage, generally determined by the type of electrolyte material used to fill the UC canister. By assembling the individual UC units, one may achieve higher voltages via serial interconnections, higher current capacity via parallel interconnections, or both. Switches may be employed to reconfigure the interconnections between UC units to change the output voltage, with concomitant changes to maximum available current. Those having ordinary skill in the art will note that serial, parallel, and switched connections allow for a range of serial and parallel combinations to achieve various voltages and maximum currents needed to power the load required for a particular application. Because certain configurations may have, for example, advantages in efficiency, reduction of generated heat in specified locations, improved load distribution across a vehicle or building's power grid, or the ability to route power around a damaged portion of a structure (e.g., comprised of individual UCs), the invention disclosed here has substantial benefit. Its real-time optimization of on-board energy and power enables a priority-driven set of business rules to determine which systems are powered, even when portions of the power system are damaged or destroyed.

As used herein, the term "Command and control data" may refer to performance parameters and models used to predict or understand how switches, sensors, capacitors, interconnects, motors, and other tangible and logical elements of this invention perform under various types of conditions such as normal temperature, humidity, and pressure, high temperature conditions, situations in which wire harnesses may be damaged or destroyed.

As used herein, the term "Command and control software" may refer to software used to process or analyze Command and control data and/or other forms of data.

As used herein, the term "Data" may refer to the real-time data from sensors, near real-time data from sensors, historical data from sensors, training data from either sensors or synthetic data sources, simulated data from synthetic sources, and/or Command and control data (defined above).

As used herein, the term "Load Group(s)" may mean one or more electric loads sharing certain common features. A Load Group will, at least for a designated period of time, have identical mission priority in terms of receiving power. It is not necessary that they share the same voltage or current requirements as power management tools are readily available to adjust voltage and current across loads within the same Load Group. Separation of key systems into different Load Groups can ensure graceful degradation of capability even when damage has occurred to some of the individual capacitors. In one non-limiting case, one engine and one fuel pump may belong to a higher priority Load Group than another engine and fuel pump, allowing propulsion to continue even with reduced power availability.

As used herein, the term "Reserve Group(s)" may mean sets of one or more electric power systems, as discussed herein, that are retained at a given charge state while other units are in use. The purpose of Reserve Groups is to ensure availability of peak power, emergency power, or some other use case that might be impossible to execute if all individual capacitors are used equally.

As used herein, the term "Supply Group(s)" may mean one or more capacitors that are designated to provide electricity to a particular load. Arising from the dynamic decision-making process within an electric power system (discussed herein), the specific capacitors that comprise a Supply Group for a given electric load may change from time to time.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 provides an example capacitor 100. Capacitor 100 (e.g., a UC, Supercapacitor, or electrochemical capacitor) may include a first panel 102 including a positive current collector 104, and a positive electrode 106. The positive electrode 106 may include a nano-structured carbon material having a density of between approximately 0.4 to 1.0 g/cm$^3$ (e.g., approximately 0.7 g/cm$^3$). The nano-structured carbon material may be configured to be fracture-resistant, and may include approximately 96% carbon by weight.

Capacitor 100 may further include a second panel 108 including a negative current collector 110, and a negative electrode 112. The negative electrode 112 may include the same nano-structured carbon material as the positive electrode 106. Capacitor 100 may further include an electrode separator 114 disposed between the first and second panels 102, 108. The electrode separator 114 may be porous and non-conductive. Capacitor 100 may further include an O-ring 116 configured to form a seal between the first and second panels 102, 108. Capacitor 100 may include an aqueous acid electrolyte solution such as 5 M sulfuric acid with a maximum capacitor voltage of approximately 2.3 volts, or an ionic salt dissolved in an organic solution such as acetonitrile with a maximum capacitor voltage of approximately 2.7 to 5.5 volts (e.g., approximately 2.7 volts, 2.8 volts, 2.9 volts, 3.0 volts, 3.1 volts, 3.2 volts, 3.3 volts, 3.4 volts, 3.5 volts, 3.6 volts, 3.7 volts, 3.8 volts, 3.9 volts, 4.0 volts, 4.1 volts, 4.2 volts, 4.3 volts, 4.4 volts, 4.5 volts, 4.6 volts, 4.7 volts, 4.8 volts, 4.9 volts, 5.0 volts, 5.1 volts, 5.2 volts, 5.3 volts, 5.4 volts, or 5.5 volts).

In some embodiments, capacitor 100 may include a sensor 118 configured to detect one or more properties of the capacitor 100, such as voltage, magnetic field, vibration, resistance, capacitance, induction, pressure, and/or temperature. Sensor 118 may be embedded or modularly attached to capacitor 100.

In some embodiments, capacitor 100 may include a control switch 120 configured to modify contact between capacitor 100 and one or more other capacitors within an electric power system, as further discussed below.

Figure 2:
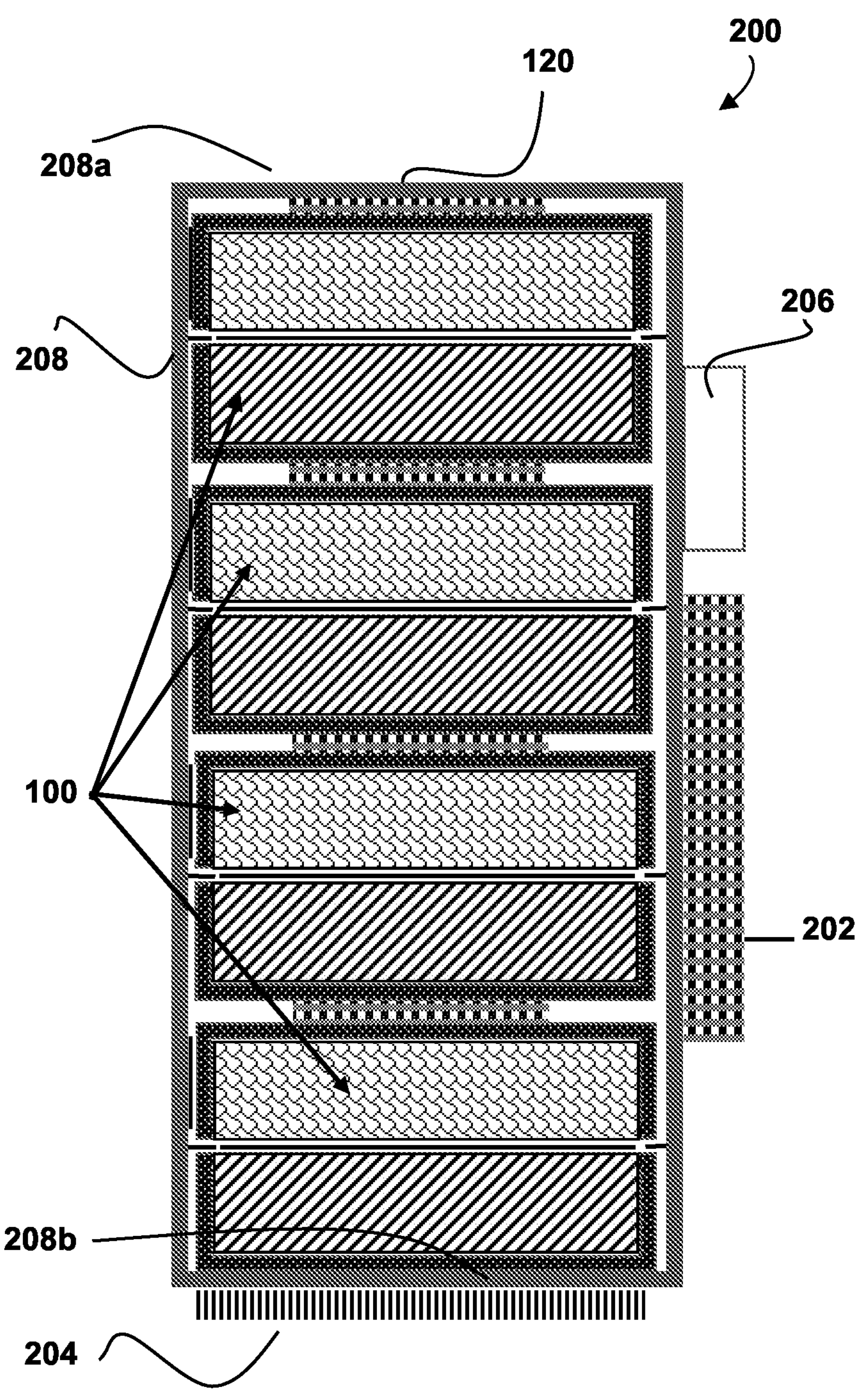
FIG. 2 provides an example electric power system including the capacitor of FIG. 1, in accordance with certain embodiments of the disclosed technology.

FIG. 2 provides an example electric power system 200 including a plurality of capacitors 100 such that the electric output of the electric power system 200 may be automatically adapted, as discussed herein. In some embodiments, the plurality of capacitors 100 may be joined together using wires or wiring harnesses.

In some embodiments, electric power system 200 may include one or more sensors 202 configured to detect one or more properties of the plurality of capacitors 100. Such one or more properties may include, for example, voltage, magnetic field, vibration, resistance, capacitance, induction, pressure, temperature, and the like. In some embodiments, sensor(s) 202 may be used to determine the current state of health and functionality of individual capacitors 100, a grouping of capacitors 100, the overall electric power system 200, and/or any attached power or hybrid power systems. Hybrid power systems may be understood by those of ordinary skill in the art to represent various heterogeneous energy or power generation systems, such as gas turbine generator matched with batteries, or an oil-fired engine matched with a battery and capacitor electric storage system. One of ordinary skill in the art will understand that the sensors, processors, and other elements of the system discussed herein may incorporate inputs, and may extend control over some, all, or none of these external elements of a hybrid energy or power system in addition to their use within a structural electric power system.

In some embodiments, electric power system 200 may include one or more control switches 204 configured to modify contact between the plurality of capacitors 100 based on the analyzed data thereby resulting in automatic adaptation of an electric output of the electric power system 200. In some embodiments, control switch(es) 204 may be configured to modify contact (e.g., include or exclude) specific capacitors 100, a grouping of capacitors 100, and/or a grouping of capacitors 100 specifically part of a Supply Group or Reserve Group, as defined herein. In some embodiments, control switch(es) 204 may be electrical, Hall effect, electromechanical, electrooptical, transistors, or mechanical switches, motors, servos, or similar devices which are used to make or break contact, thereby reconfiguring the voltage and/or current available to be supplied to such Supply or Reserve Groups, and/or by the electric power system 200. Control switch(es) 204 may be operated according to a schedule, new automated commands in reaction to a change of state such as damage, charge completion, or energy depletion, or manual override via digital, mechanical, electromechanical, electronic, thermal, pressure, hydraulic, pneumatic, or similar mechanism.

In some embodiments, electric power system 200 may include one or more processors 206 configured to analyze data associated with the detected one or more properties based on one or more algorithms. In some embodiments, processor(s) 206 may be used to analyze Data and/or Command and control data to compare current performance to desired performance and a prioritized list of system requirements.

In some embodiments, the algorithm(s) may enable the processor(s) 206 to receive data regarding historical performance and energy requirements of Load Groups or other load systems, which optionally include parameterization by operational and environmental factors such as temperature, humidity, fraction of maximum power needed, priority given to that system compared to other systems, degradation of individual cells or units, time required to carry out specific tasks (e.g., to operate a washing machine, charge and fire a directed energy weapon, or level a powerline dip or surge given the power spectrum of the electric grid's recent variability).

In some embodiments, the algorithm(s) may enable the processor(s) 206 to receive sensor data and metadata, normalize it, compare it to model predictions using statistical, signal processing, neural network, and filtering, and make predictions for the near future. In utilizing sensor inputs, models trained from historical use, and appropriate algorithms, for example, Kalman filters or application of trained neural networks, calculations may be made to predict the near-future state of charge, temperature, remaining energy storage level, resistive heating, capacitive or inductive coupling and energy losses, mechanical stresses, thermal stresses, and other quantities salient to the safe and resilient operation of the electric power system 200. For example, the electric power system 200 may be configured with an ability to automatically and dynamically change the switch configuration to maintain a desired energy to prioritize Load Groups, as further discussed herein.

In some embodiments, the processor(s) 206 may be connected to data storage, display units, control sensors (e.g., sensor(s) 202), control switches (e.g., control switch (es) 204) and/or motors. Processor(s) 206 may analyze these inputs, perform detailed comparisons of conditions, models, and desired outcomes, calculate various configurations for the overall system in terms of prioritized need for voltages, current available to support each load according to its priority and further considering the impact of switching in terms of disruptions, potential for arcing, inductance changes, capacitive effects and changes, each load's power profile in terms of voltage, current, expected duration of load, mission criticality, and the level of autonomy granted by system operator. Other relevant control profiles may involve governing the prioritization of Load Groups based on requirements or environmental considerations. Processor (s) 206 may be computers, computer central processing units (CPUs), graphical processing units (GPUs), single board computers (SBCs), field programmable gate arrays (FPGAs), digital signal processors (DSPs), peripheral interface controllers (PIC), embedded processors, integrated circuits, specially designed application specific integrated circuits (ASIC), servers, cloud-based computer resources, and similar types of digital or analog data processing units. Further, different software modules, as further discussed below, may be run on different processors.

In some embodiments, electric power system 200 may include a module (not shown) configured to execute a selected configuration option and pass any relevant messages to operators and information processing software routines. This module may also conduct monitoring of other software systems in order to issue alerts if a system is unavailable and requires corrective action. This module may attempt such corrective action, including automatically rerouting power according to alternative power distribution options, if needed. This module may include software written in machine language and similar low-level programming languages, high-level programming languages such as C, C++, FORTRAN, and similar, or very high-level or scripting languages such as Python, PERL, or similar. The module may also use web, data analysis, and data-visualization tools, packages, and languages to convey, communicate, and present informative data to users and administrators.

In some embodiments, electric power system 200 may include a housing 208 configured to surround at least the plurality of capacitors 100. Housing 208 may include a first portion or side having a positive current collector 208*a*, and a second portion or side having a negative current collector 208*b*.

In some embodiments, electric power system 200 may include one or more data storage units (not shown) including computer random access memory, hard drives, solid state drives, network attached storage, cloud or internet-based storage, magnetic disks, optical disks, backup storage, databases, files, transient and permanent data files, and other mechanisms for the storage and retrieval of digital data.

In some embodiments, electric power system 200 may include one or more data display units (not shown) including flat-panel displays, cathode ray tubes, printers, 3-D or additive manufacturing printers, holographic displays, and other means for the qualitative and quantitative display of information used for similar purposes by those working with data processing equipment.

In some embodiments, electric power system 200 may include auxiliary software configured to ensure normal information technology and security requirements are met. One of ordinary skill in the art will understand that database management, communications, encryption, error checking, metadata normalization, garbage collection, exception handling, training, memory management, and numerous other software functions may be performed. This software may also be written in machine language and similar low-level programming languages, high-level programming languages such as C, C++, FORTRAN, and similar, or very high-level or scripting languages such as Python, PERL, or similar, and may use web, analysis, and data-visualization tools, packages, and languages to convey, communicate, and present informative data to users and administrators.

Figure 3:
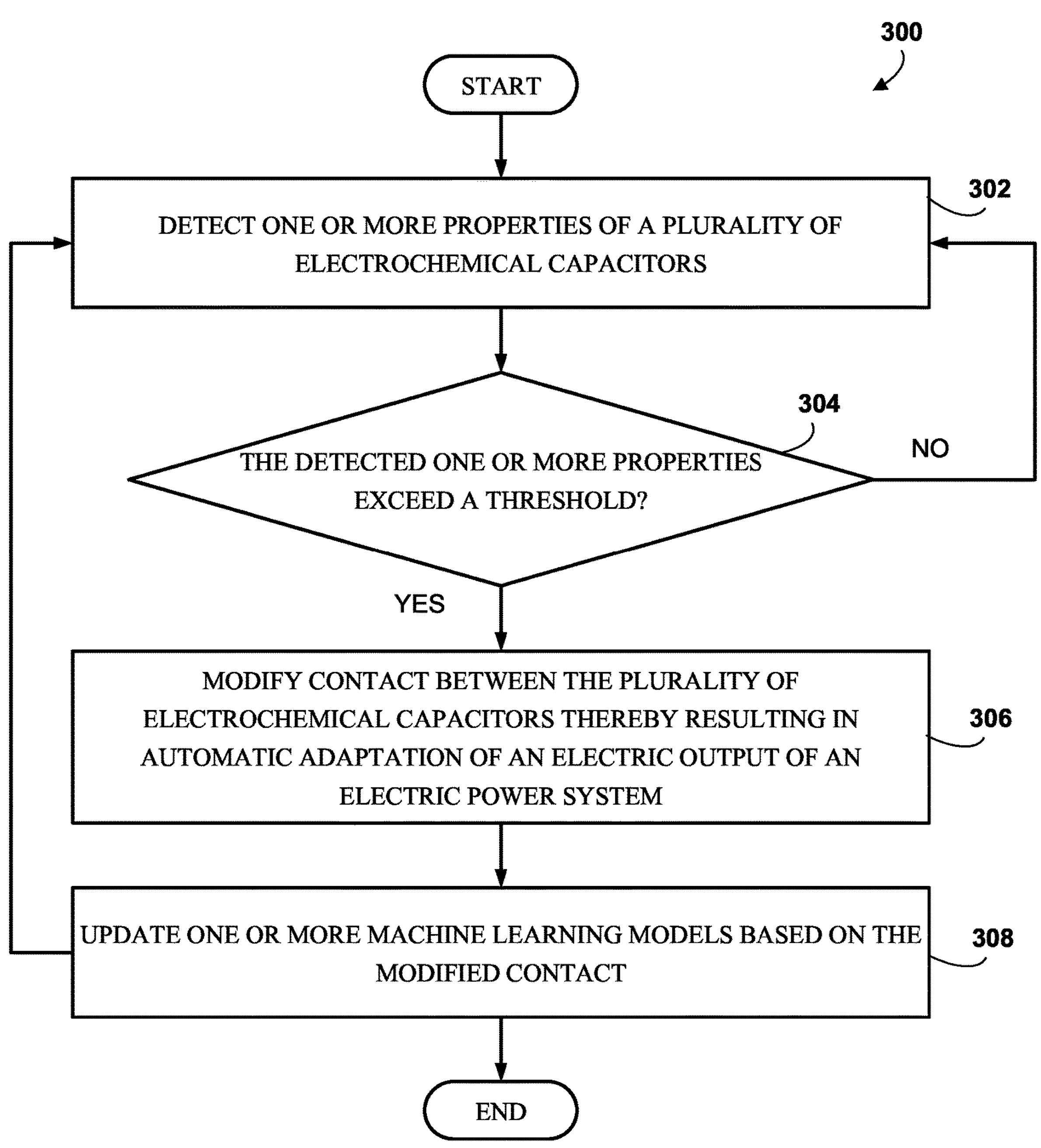
FIG. 3 is a flowchart for a method of automatically adapting an electric output of an electric power system, in accordance with certain embodiments of the disclosed technology.

FIG. 3 is a flowchart for a method 300 of automatically adapting an electric output of an electric power system (e.g., electric power system 200), in accordance with certain embodiments of the disclosed technology. The steps of method 300 may be performed by one or more components of the electric power system 200 (e.g., capacitor(s) 100, sensor(s) 202, control switch(es) 204, processor(s) 206, etc.).

In block 302, the electric power system 200 may detect, by the one or more sensors (e.g., sensor(s) 202), one or more properties of the plurality of capacitors (e.g., capacitors 100). For example, as discussed herein, the sensor(s) may be used to continuously monitor different properties of each capacitor, such as voltage, magnetic field, vibration, resistance, capacitance, induction, pressure, and/or temperature. In some embodiments, the system may be configured to compare this sensor data with previous property predictions and/or previously trained models as part of an iterative or adaptive process, as discussed herein.

In block 304, the electric power system 200 may determine, utilizing one or more machine learning models or procedural algorithms and heuristics, whether the detected one or more properties exceed a threshold. In some embodiments, the model(s) and/or algorithms used may be selected based on relevancy given, for example, the application in which the capacitors and/or the electric power system are being used. For example, the model(s) used may include a Kalman filter, Hidden Markov model, linear extrapolation, etc. In some embodiments, the machine learning model(s) may be trained based on one or more algorithms, as discussed herein, in making such determination. In some embodiments, the threshold may include a default threshold, an automatic threshold, or a user-selected threshold. In some embodiments, the threshold may be based on identified deviations from nominal or acceptable conditions given, for example, the application in which the capacitors and/or the electric power system are being used.

In block 306, responsive to determining the detected one or more properties exceed the threshold, the electric power system 200 may modify, by the one or more control switches (e.g., control switch(es) 204), contact between the plurality of capacitors thereby resulting in automatic adaptation of an electric output of the electric power system. In some embodiments, the system may formulate control switch reconfiguration options and compare each option with the sufficiency of a potential solution given, for example, Load Group requirements.

In block 308, the system 200 may update the one or more machine learning models based on the modified contact. For example, the system may select the best or most optimized option from the reconfiguration options (discussed above), and update the model(s) accordingly such that the model(s) are continuously trained and/or updated.

The system models, algorithms, training data, and Command and control software may be updated either in situ based on adaptive learning of the system's response or episodically via external software updates and upgrades. These system updates being verified for security and proper functioning, are assessed before being allowed to run.

EXAMPLE USE CASES

The following example use cases describe applications in which the capacitors and/or electric power systems disclosed herein may be used. This section is intended solely for explanatory purposes and not in limitation.

Buildings and other structures are built from components that often require significant strength and occupy relatively large volumes, such constituent components frequently assuming complex, non-planar shapes. As distributed power generation becomes more common from wind, solar photovoltaic solutions, and other technologies, distributed storage is increasingly sought to reduce price tariff dependencies, reduce transmission losses and costs, and to add local resilience against power loss. The use of structural UCs to form walls and other structures provides an opportunity to increase space utilization and potentially reduce cost. However, walls, roofs, and other construction elements are exposed to weather, potential impact, and other hazards that may damage or destroy individual components. To prevent catastrophic loss of functionality, an adaptive power system is desirable. The following non-limiting embodiments teach use cases and provide examples of both functionality and the technical approach. One of ordinary skill in the art will note the opportunity to use many small variations that afford great flexibility to employ the innovation.

Building walls and roofs offer a vast volume of potential electric energy storage when summed over the many residential, commercial, industrial, public, and governmental structures that exist. Exposed to diurnal, seasonal, and storm environmental challenges, these structures often sustain damage. The systems disclosed herein may provide a mechanism to preserve the most important functionality when the energy storage system nears depletion or is damaged. For example, during an electric power blackout there is likely no need for outside lights during the day, so power would be diverted from that application. However, during a sudden loss of power at night in a crowded stadium, it is presumably far more important to maintain lighting than almost any other energy-consuming function. In a hospital environment, there may be other top priority electric loads like ventilators that must be protected. Weather or time of day may lead to prioritization of heating, air-handling, or mechanical pumps.

Wind turbine towers offer substantial volume in which electric energy may be stored. Because wind turbines are more broadly distributed than classic power generation plants, they can be tools to facilitate load-leveling across the energy distribution grid. Adding resilience to these storage centers increases overall powerline resilience. Storms that cause damage to a portion of a tower's storage system need not knock out the entire tower's ability to contribute to the distribution system. For example, the impact of a tree destroying part of a wind turbine tower that has been equipped with an electric power system as disclosed herein will not destroy the remaining storage capacity if, and only if, it is safe to continue operating.

Auxiliary structures such as tool sheds, guard houses, parking booths, or band shells at a park all serve specified purposes. When those structures serve multiple purposes, especially if power is both required and unreliable, it can be difficult to manage competing missions; suboptimal power management is almost certain. The electric power systems disclosed herein may thus help to manage the power consumption to ensure energy is not expended on unintended purposes.

Ground vehicles are increasingly powered by electric or hybrid electric energy systems. There is a growing need to move away from lithium batteries, and their dependence upon cobalt, nickel, and other materials. UCs represent one of the more efficient and ecologically advantageous technologies to do so. The use of structural UCs to form doors, exterior panels, or portions of the roof are inevitable. So too are motor vehicle accidents that will break some of those panels. The electric power systems disclosed herein may thus add much-needed resilience by allowing a vehicle involved in a fender-bender to retain enough energy to drive many miles to a safe location for repair.

Aircraft with all-electric engines are beginning to emerge in mainstream applications like commercial air travel. The safety requirements for such planes are stringent. Maintaining airspeed in the event of a bird-strike, an engine malfunction, or destruction of a portion of a plane's fuselage must not destroy the plane's ability to fly. Autonomous rerouting of power from undamaged UCs to the engines based on a sudden loss of current as measured by certain sensors disclosed herein would occur before loss of control of the aircraft.

Space craft are subject to extreme temperature changes, blasts of ionizing radiation, and MMOD strikes. Any of these factors can cause a loss of functionality in the power system. It is essential that air management, flight control, and a number of other systems remain functional at all times. Other systems, such as communications, are important, but may not require constant power. In the event an MMOD strike were to disable a portion of the energy system, automated rerouting of power would take the place of manually repairing wire harnesses.

Ships and submarines, like aircraft, require emergency and reserve power during operation. The corrosive environment generated by sea water and the threat of flooding force maritime engineers to incorporate redundant control mechanisms. By including water sensors and/or sensors to detect changes in resistance, capacitance, and/or inductance, the electric power systems disclosed herein could help to evaluate the threat of flooding and/or corrosion. Detection of corrosion serves as an alarm that preventative maintenance is needed and allows operators to reassess mission priorities and to plan for alternative mission operations before a crisis occurs.

Various end user goods, such as tools and their cases, furniture, interior wall panels, trim, furnishings, and similar items can also serve as energy storage devices. Since these items are exposed to potential impact or other hazards, installation of an electric power system as disclosed herein may be useful. A bookcase that falls and sustains damage or a shelf that stores electricity may be able to automatically reconfigure its connections to retain use of residual energy storage instead of being entirely dysfunctional. Its health status can be communicated via, for example, a Bluetooth™, WiFi™, near-field communication (NFC), LiFi™, radio, wired or other network connection to apprise its owner of its status. Indeed, these updates can serve as an independent assessment of the environment, enabling an absent user to learn of a flood, broken heater, malfunctioning air conditioner, burst water heater, dishwasher, or laundry machine, etc.

Protective armor systems for military vehicles, personnel, weapon systems, and radar, electronic warfare, radio, and communication systems have many of the same considerations as the civilian equipment and systems discussed above. They are also subject to battle damage, which likely would occur just when the system's resilience is in greatest need. A military aircraft taking battle damage must be able to survive, carry out its mission, and return its crew to safety, even if part of its electrical system is destroyed. Real-time routing of energy from Supply Groups and Reserve Groups to Load Groups as a military mission evolves will necessarily require priority-driven reassignment of power.

Similarly, a navy vessel will require propulsion, even if it receives battle damage. However, point defense weapon systems and their radars may, briefly, be even more important than propulsion during a battle. This dynamic rerouting of power becomes the system's response to changing operating parameters by synthesizing sensor inputs, command priorities, and training models and algorithms through the Command and control software.

In some examples, disclosed systems or methods may involve one or more of the following clauses:

Clause 1: A capacitor comprising: a first panel comprising: a positive current collector; and a positive electrode comprising a nano-structured carbon material having a density of between approximately 0.4 to 1.2 g/cm$^3$; a second panel comprising: a negative current collector; and a negative electrode comprising the nano-structured carbon material; an electrode separator disposed between the first and second panels; and an O-ring configured to form a seal between the first and second panels.

Clause 2: The capacitor of clause 1, wherein the nano-structured carbon material has a density of approximately 0.7 g/cm$^3$.

Clause 3: The capacitor of clause 1, wherein the nano-structured carbon material is fracture resistant.

Clause 4: The capacitor of clause 1, wherein the nano-structured carbon material comprises approximately 96 percent carbon by weight.

Clause 5: The capacitor of clause 1, wherein the electrode separator is porous and non-conductive.

Clause 6: The capacitor of clause 1, wherein the capacitor is an electrochemical capacitor.

Clause 7: An electric power system comprising: a plurality of capacitors each comprising: a first panel comprising: a positive current collector; and a positive electrode comprising a nano-structured carbon material having a density of between approximately 0.4 to 1.2 g/cm$^3$; a second panel comprising: a negative current collector; and a negative electrode comprising the nano-structured carbon material; an electrode separator disposed between the first and second panels; and an O-ring configured to form a seal between the first and second panels; one or more sensors configured to detect one or more properties of the plurality of capacitors; one or more processors configured to analyze data associated with the detected one or more properties based on one or more algorithms; and one or more control switches configured to modify contact between the plurality of capacitors based on the analyzed data thereby resulting in automatic adaptation of an electric output of the electric power system.

Clause 8: The electric power system of clause 7, wherein the one or more properties comprise voltage, magnetic field, vibration, resistance, capacitance, induction, pressure, temperature, or combinations thereof.

Clause 9: The electric power system of clause 7, further comprising a housing configured to surround at least the plurality of capacitors.

Clause 10: The electric power system of clause 9, wherein the housing comprises a second positive current collector and a second negative current collector.

Clause 11: An electric power system comprising: a plurality of capacitors; one or more sensors; one or more processors; one or more control switches; and a memory in communication with the one or more processors and storing instructions that, when executed by the one or more processors, are configured to cause the electric power system to: iteratively, until termination: detect, by the one or more sensors, one or more properties of the plurality of capacitors; determine, utilizing one or more machine learning models, whether the detected one or more properties exceed a threshold; responsive to determining the detected one or more properties exceed the threshold, modify, by the one or more control switches, contact between the plurality of capacitors thereby resulting in automatic adaptation of an electric output of the electric power system; and update the one or more machine learning models based on the modified contact.

Clause 12: The electric power system of clause 11, wherein each of the plurality of capacitors comprises a nano-structured carbon material.

Clause 13: The electric power system of clause 12, wherein the nano-structured carbon material has a density of approximately 0.7 g/cm$^3$.

Clause 14: The electric power system of clause 12, wherein the nano-structured carbon material is configured to be fracture resistant.

Clause 15: The electric power system of clause 12, wherein the nano-structured carbon material comprises approximately 96 percent carbon by weight.

Clause 16: The electric power system of clause 12, wherein each of the plurality of capacitors is an electrochemical capacitor and comprises: a first panel comprising: a positive current collector; and a positive electrode comprising the nano-structured carbon material; a second panel comprising: a negative current collector; and a negative electrode comprising the nano-structured carbon material; an electrode separator disposed between the first and second panels; and an O-ring configured to form a seal between the first and second panels.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all, or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g., "about 10 g/cm$^3$" may refer to the range of values from 8 g/cm$^3$ to 12 g/cm$^3$.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of the technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system comprising:
a plurality of capacitors;
one or more sensors;
one or more processors;
one or more control switches; and
a memory in communication with the one or more processors and storing instructions that, when executed by the one or more processors, are configured to cause the electric power system to:
iteratively, until termination:
detect, by the one or more sensors, one or more properties of the plurality of capacitors;
determine, utilizing one or more machine learning models, whether the detected one or more properties exceed a threshold;
responsive to determining the detected one or more properties exceed the threshold;
generate, by the one or more machine learning models, control switch reconfiguration options for modifying contact between the plurality of capacitors;
modify, by the one or more control switches, the contact between the plurality of capacitors according to the control switch reconfiguration options, thereby resulting in automatic adaptation of an electric output of the electric power system; and
update the one or more machine learning models based on the modified contact.

2. The electric power system of claim 1, wherein each of the plurality of capacitors comprises a nano-structured carbon material.

3. The electric power system of claim 2, wherein the nano-structured carbon material has a density of approximately 0.7 g/cm$^3$.

4. The electric power system of claim 2, wherein the nano-structured carbon material is configured to be fracture resistant.

5. The electric power system of claim 2, wherein the nano-structured carbon material comprises approximately 96 percent carbon by weight.

6. The electric power system of claim 2, wherein each of the plurality of capacitors is an electrochemical capacitor and comprises:
a first panel comprising:
a positive current collector; and
a positive electrode comprising the nano-structured carbon material;
a second panel comprising:
a negative current collector; and
a negative electrode comprising the nano-structured carbon material;
an electrode separator disposed between the first and second panels; and
an O-ring configured to form a seal between the first and second panels.

7. The electric power system of claim 1, wherein:
the one or more properties comprise one or more of voltage, magnetic field, vibration, resistance, capacitance, induction, pressure, temperature, or combinations thereof, and
the one or more machine learning models are trained to compare the detected one or more properties to previous property predictions to determine whether the detected one or more properties exceed the threshold.

8. A method for automatically adapting an electric output of an electronic power system, the method comprising:

continuously detecting, using one or more sensors, one or more properties of a plurality of capacitors;

determining, using one or more machine learning models, whether the detected one or more properties exceed a threshold;

responsive to determining the detected one or more properties exceed the threshold:

generating, by the one or more machine learning models, control switch reconfiguration options for modifying contact between the plurality of capacitors;

modifying, by one or more control switches, the contact between the plurality of capacitors according to the control switch reconfiguration options, thereby resulting in automatic adaptation of the electric output of the electric power system; and updating the one or more machine learning models based on the modified contact.

9. The method of claim 8, wherein the one or more properties comprise one or more of voltage, magnetic field, vibration, resistance, capacitance, induction, pressure, temperature, or combinations thereof.

10. The method of claim 8, wherein the one or more machine learning models are trained to compare the detected one or more properties to previous property predictions to determine whether the detected one or more properties exceed the threshold.

11. The method of claim 8, wherein updating the one or more machine learning models comprises selecting a first option of the control switch reconfiguration options and updating the one or more machine learning models based on the first option.

12. The method of claim 8, wherein each of the plurality of capacitors comprises:

a first panel comprising:

a positive current collector and a positive electrode comprising a nano-structured carbon material; and a second panel comprising:

a negative current collector; and a negative electrode comprising the nano-structured carbon material; and an electrode separator disposed between the first and second panels.

13. The method of claim 12, wherein the nano-structured carbon material has a density between approximately 0.4 to 1.2 g/cm$^3$.

14. The method of claim 13, wherein the nano-structured carbon material comprises between approximately 90 and 99.5 percent carbon by weight.

15. The method of claim 12, wherein the electrode separator is porous and non-conductive.

16. The method of claim 12, wherein each of the plurality of capacitors is an electrochemical capacitor.

17. The method of claim 12, wherein each of the plurality of capacitors further comprises a seal between the first and second panels.

18. The method of claim 17, wherein each of the plurality of capacitors further comprises an O-ring configured to form the seal between the first and second panels.

19. The method of claim 12, wherein the nano-structured carbon material has a density between approximately 0.5 to 1.1 g/cm$^3$.

20. The method of claim 12, wherein the nano-structured carbon material has a density of approximately 0.7 g/cm$^3$.

* * * * *